United States Patent [19]

Doctor

[11] Patent Number: 5,775,646
[45] Date of Patent: Jul. 7, 1998

[54] SELF-POWERED HORIZON CROSSING INDICATOR

[75] Inventor: Alan P. Doctor, Sea Cliff, N.Y.

[73] Assignee: Servo Corporation of America, Westbury, N.Y.

[21] Appl. No.: 535,625

[22] Filed: Sep. 28, 1995

[51] Int. Cl.⁶ .................................................. B64G 1/36
[52] U.S. Cl. ..................... 244/171; 244/158 R; 73/178 R
[58] Field of Search ........................... 244/158 R, 164, 244/171; 73/178 R

[56] References Cited

U.S. PATENT DOCUMENTS

| 3,337,160 | 8/1967 | Eckermann, Jr. .................. 244/171 |
| 5,079,419 | 1/1992 | Falbel . | |
| 5,152,482 | 10/1992 | Perkins et al. .................. 244/158 R |
| 5,452,869 | 9/1995 | Basuthankur et al. ............ 244/171 X |

FOREIGN PATENT DOCUMENTS

| 2132837 | 7/1984 | United Kingdom ............... 244/158 R |

Primary Examiner—William Grant
Attorney, Agent, or Firm—Kane, Dalsimer, Sullivan, Kurucz, Levy, Eisele and Richard, LLP

[57] ABSTRACT

The apparatus is an earth horizon crossing indicator used in a spacecraft attitude control system, which uses power from a self-contained battery rather than power from the spacecraft electrical system. The battery is typically of the lithium thionyl chloride type. This reduces the weight and complexity of the spacecraft attitude control system and allows the resources of the spacecraft electrical system to be used for other devices.

2 Claims, 1 Drawing Sheet

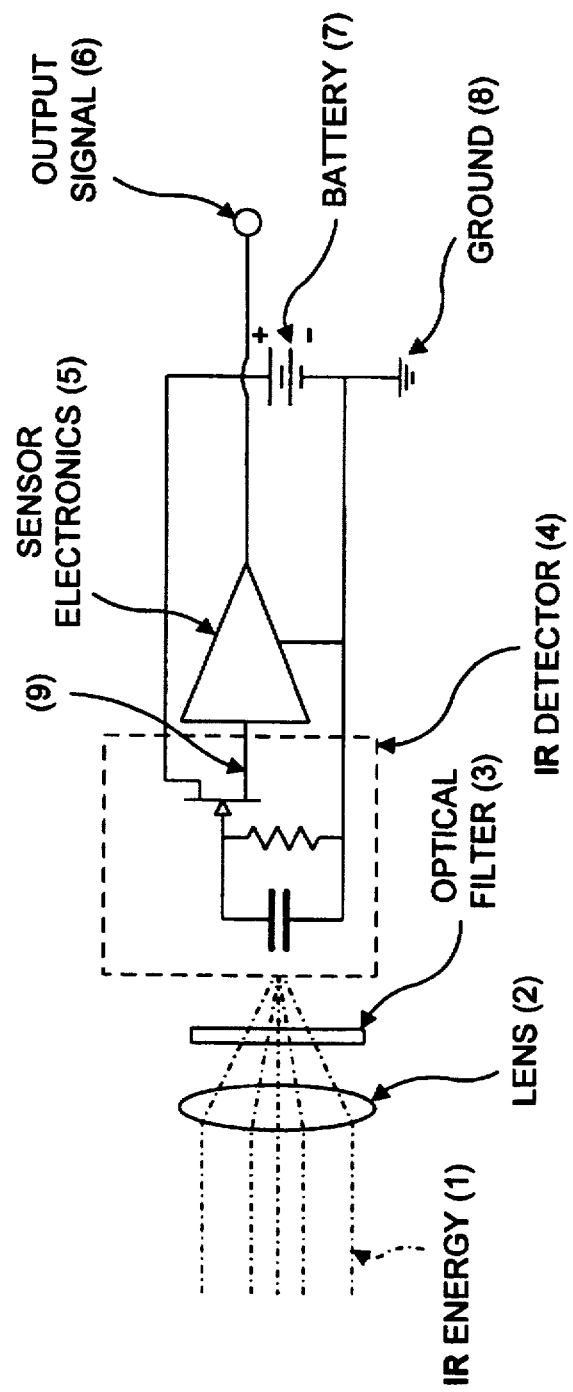

SELF-POWERED HORIZON CROSSING INDICATOR

BACKGROUND OF THE INVENTION

1. Field of the Invention

This invention pertains to an earth horizon crossing indicator used in a spacecraft attitude control system, which uses power from a self-contained battery rather than power from the spacecraft electrical system.

2. Description of the Prior Art

The use of earth horizon crossing indicators (HCI) in spacecraft attitude control systems is well known in the prior art. An example of an earth horizon crossing sensor can be found in U.S. Pat. No. 3,920,994 entitled "Earth Horizon Sensor". Earth horizon crossing indicators are used in spacecraft attitude control systems to determine the pitch and roll attitude of an Earth orbiting spacecraft which spins about its own axis. These units have used optical or other sensors which require the use of large and very well filtered voltages and/or currents to operate. This electric power has been supplied by the spacecraft's power distribution system which, in turn, obtains power from solar panels in conjunction with rechargeable batteries. The electric power available is therefore limited. Moreover, connecting the sensors and associated electronics to the power system of the spacecraft has added complexity and mass, as well as used power which could be used for other applications.

Recent improvements in horizon crossing sensors have resulted in lower power requirements for the optical sensor. Similarly, the use of micropower electrical circuits has reduced the power requirements for the associated electronics of a horizon crossing indicator.

OBJECTS AND SUMMARY OF INVENTION

It is therefore an object of the present invention to reduce the weight of an earth horizon crossing indicator in a spacecraft attitude control system.

It is therefore a further object of the present invention to reduce the wiring and complexity associated with an earth horizon crossing indicator in a spacecraft attitude control system.

It is therefore a final object of the present invention to reduce or eliminate the power requirements of an earth horizon crossing indicator from the central power supply of a spacecraft.

These and other objects are attained by providing an earth horizon crossing indicator in a spacecraft attitude control system with a very low operating voltage and current pyroelectric infrared detector with a micropower electronic assembly all powered by a long lived internal battery. With the present invention, there is no need to connect to the spacecraft's power buss thereby reducing the complexity, mass and power requirements of a spacecraft. This system can be expected to have an operating life in excess of five years which, in many cases, exceeds the spacecraft's mission life or the need for an earth horizon crossing indicator.

BRIEF DESCRIPTION OF THE DRAWING

Further objects and advantages of the invention will become apparent from the following description and claims, and from the accompanying drawing, wherein:

The FIGURE is a schematic of the apparatus of the present invention.

DETAILED DESCRIPTION OF THE PREFERRED EMBODIMENT

Referring now to the FIGURE in detail, one sees a schematic of the apparatus of the present invention.

An infrared detector 4 with the lens 2 and filter 3 are positioned so that infrared rays 1 form an image of the Earth and its horizon and are projected by lens 2 on the detector 4.

Detector 4 detects the incident IR radiation and generates a corresponding electrical signal on line 9. This signal is conditioned by a signal conditioning circuit 5, which may include filtering and amplification means.

Battery 7 is used to power the electronic components, including the IR detector 4, and the amplifier 5. Battery 7 further has a negative terminal attached to "ground" of the satellite. Battery 7 is a long-lived internal battery, typically of a lithium thionyl chloride configuration. As the electronics of the apparatus in the FIGURE is free from connection to the power supply of the satellite, the resources of the power supply of the satellite can be efficiently allocated to other functions.

The sensor operates in the fashion that the sensor's field of view is first directed toward a source of IR energy which in this case is the thermal energy of space (commonly a blackbody at 2.3° kelvin) and then as this field of view is moved or scanned by the spinning motion of the satellite onto and across the earth (commonly a blackbody at 220° kelvin) and again into space an output signal is produced as an indication that the field of view has crossed the earth's horizon.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. In an earth horizon crossing indicator attitude control system for a satellite, an earth horizon crossing indicator comprising a detector and electronic signal processing means responsive to the detector, wherein the satellite includes a power supply, and the improvement comprises a dedicated battery providing power to said electronic signal processing means, whereby said electronic signal processing means is electrically isolated from the power supply of the satellite.

2. The earth horizon crossing indicator attitude control system of claim 1 wherein the battery is of a lithium thionyl chloride configuration.

* * * * *